United States Patent [19]
Sedighzadeh

[11] Patent Number: 5,139,223
[45] Date of Patent: Aug. 18, 1992

[54] WALL/CEILING SUPPORT FOR TELEVISION MONITOR

[76] Inventor: Marty Sedighzadeh, 11504 W. Pl., Littleton, Colo. 80127

[21] Appl. No.: 682,682

[22] Filed: Apr. 9, 1991

[51] Int. Cl.⁵ ............................................... A47G 29/00
[52] U.S. Cl. ........................................ 248/324; 52/39; 248/278
[58] Field of Search ............ 248/324, 323, 317, 342, 248/327, 278, 282, 284, 289.1, 291, 285, 558; 52/39

[56] References Cited

U.S. PATENT DOCUMENTS

| | | | |
|---|---|---|---|
| 3,574,340 | 4/1971 | Busche | 248/324 X |
| 3,782,065 | 1/1974 | Griffing | 52/39 |
| 3,981,340 | 9/1976 | Anderson et al. | 248/324 X |
| 4,410,158 | 10/1983 | Maffei | 248/279 X |
| 4,487,389 | 12/1984 | Ziegler | 248/282 |
| 4,959,645 | 9/1990 | Balz | 248/920 X |
| 4,993,676 | 2/1991 | Fitts et al. | 52/39 X |
| 5,007,608 | 4/1991 | Carroll, Jr. | 248/297.1 X |
| 5,026,017 | 6/1991 | Kreuzer | 248/324 |

*Primary Examiner*—Ramon O. Ramirez
*Attorney, Agent, or Firm*—Gary M. Polumbus

[57] ABSTRACT

A support system for mounting a television monitor on a ceiling or wall is described in various embodiments providing various options for ceiling or wall mounting and for interconnection with a television monitor. Means are provided for adjusting the viewing angle of the television monitor about a horizontal axis and in some embodiments swivel means are provided for rotating the monitor about a vertical axis to further accommodate optimal viewing.

18 Claims, 4 Drawing Sheets

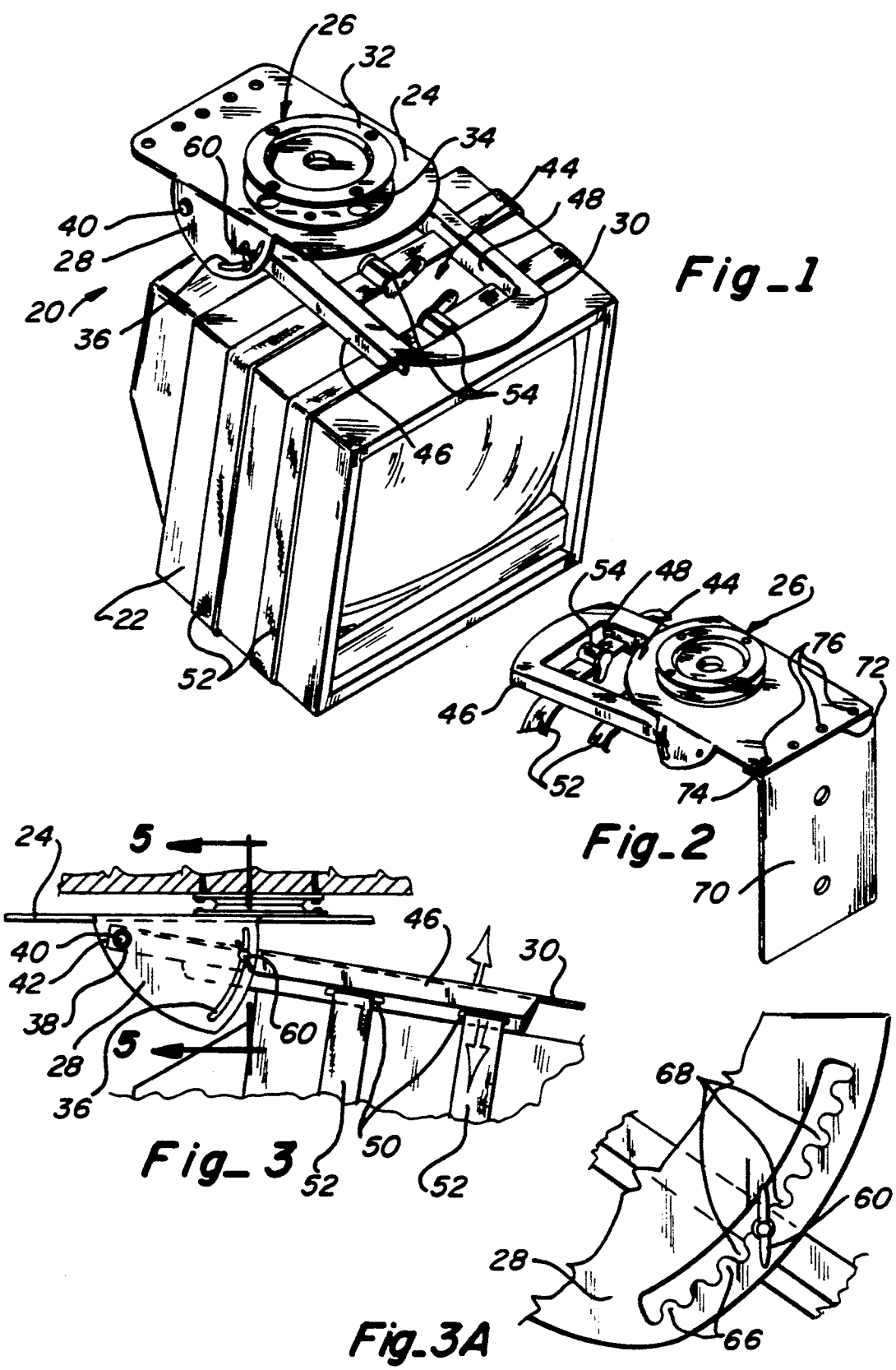

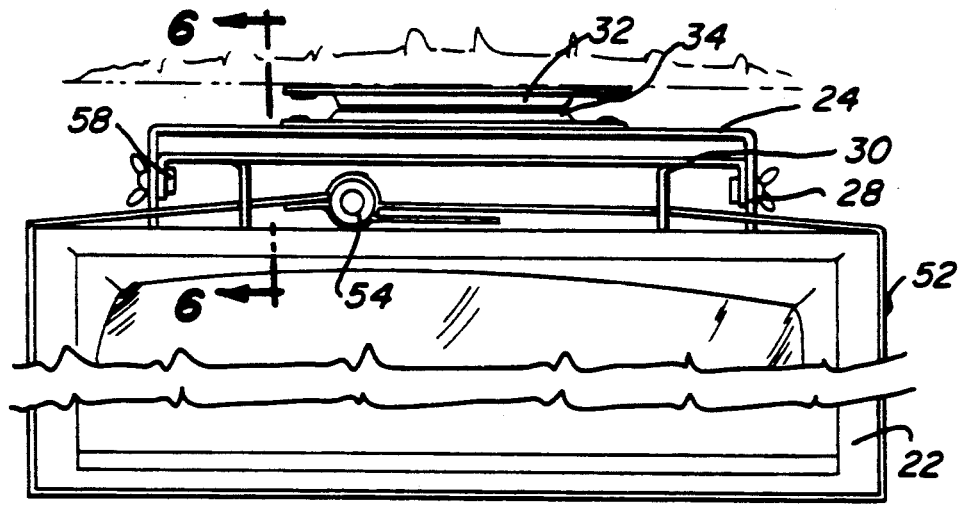
Fig_4
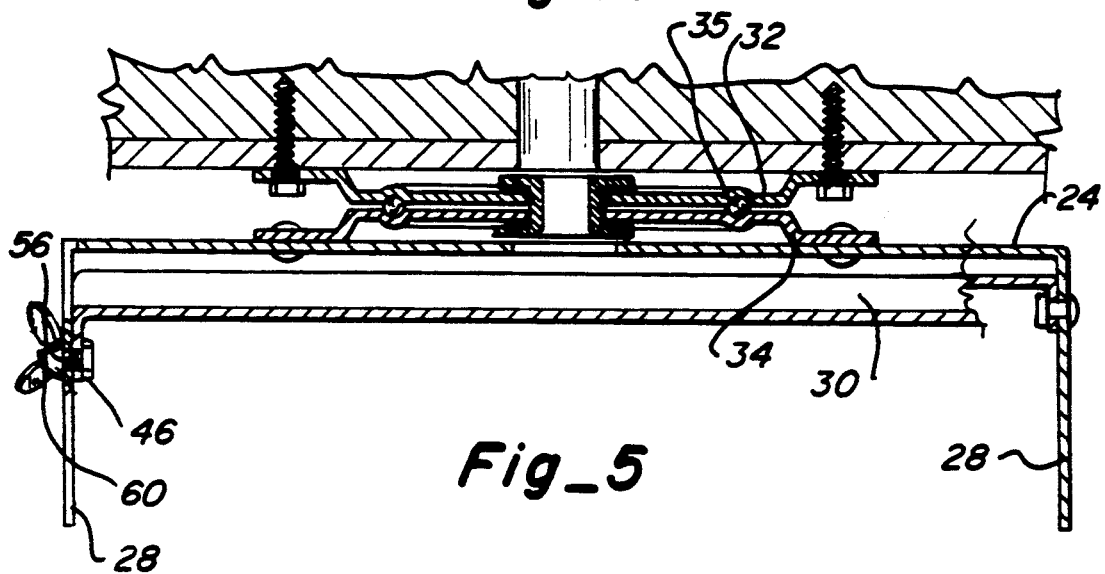
Fig_5
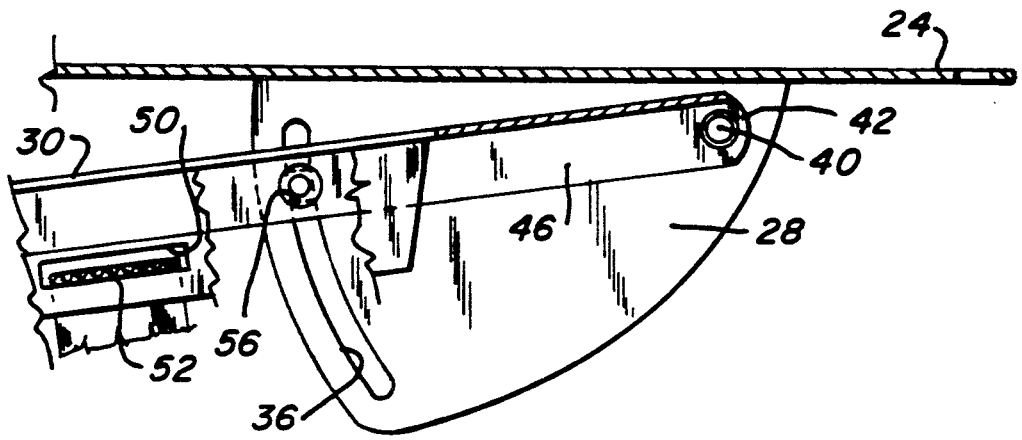
Fig_6

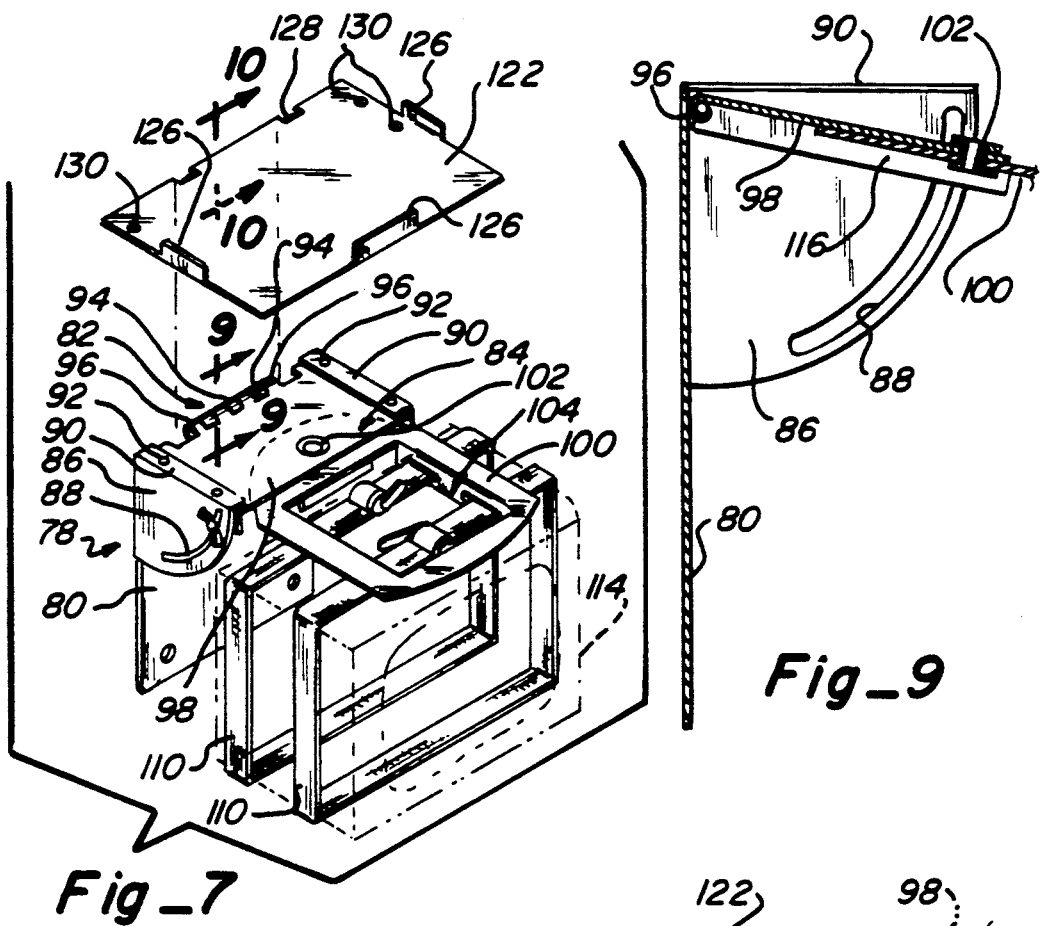
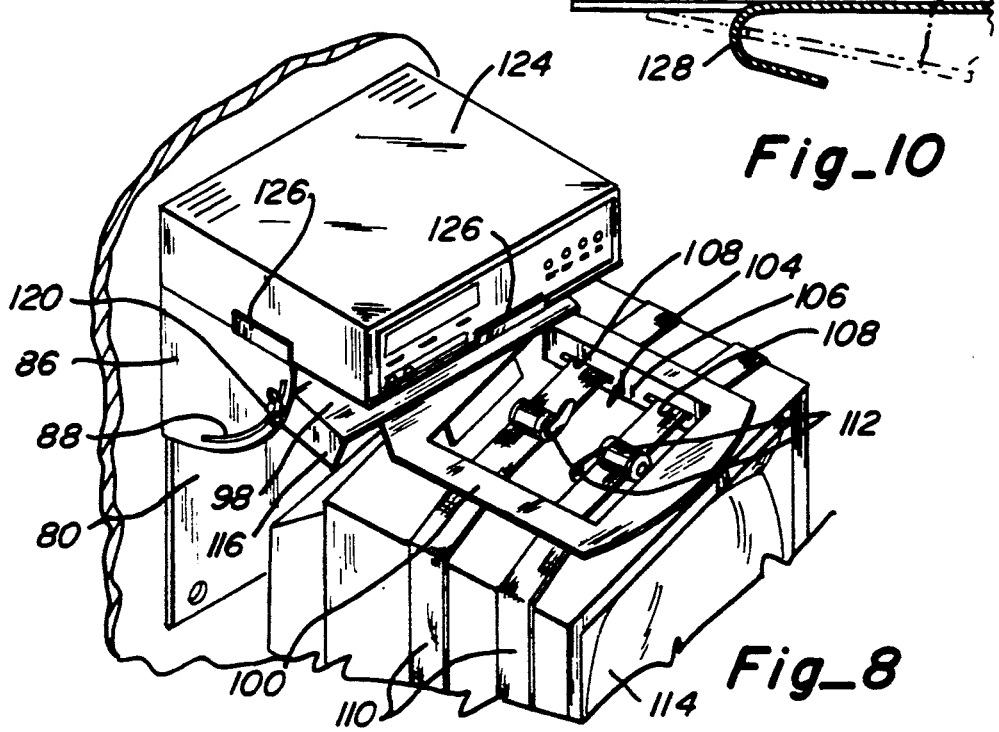

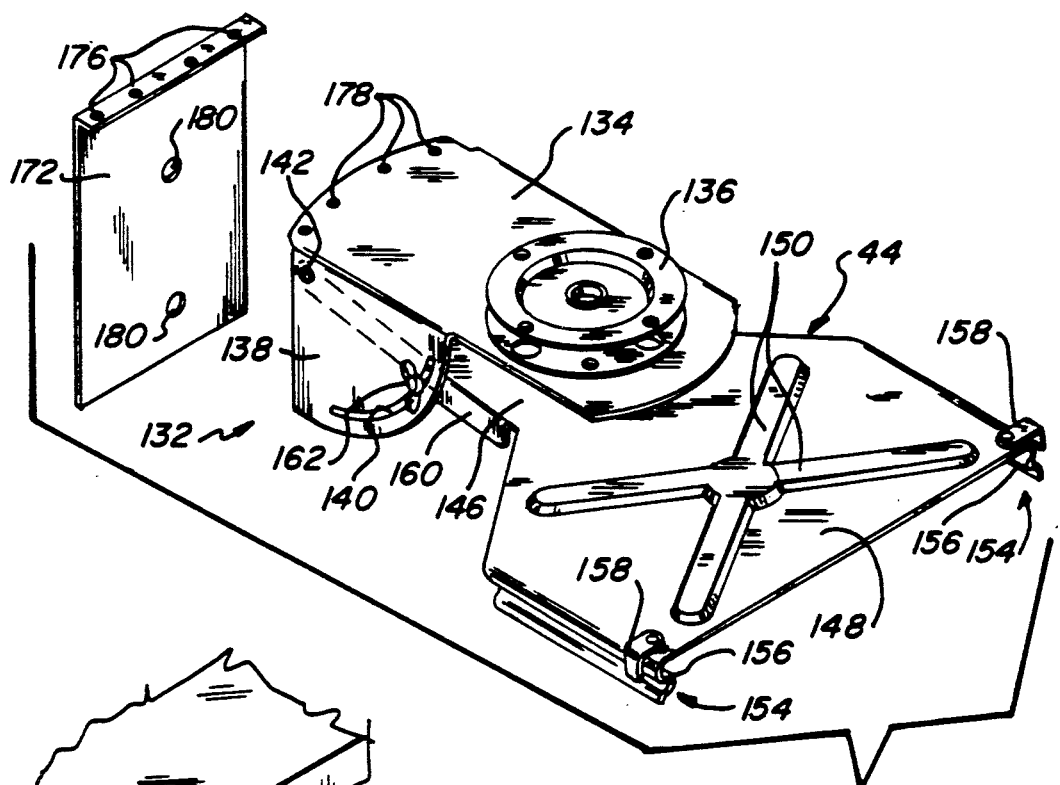
Fig_11
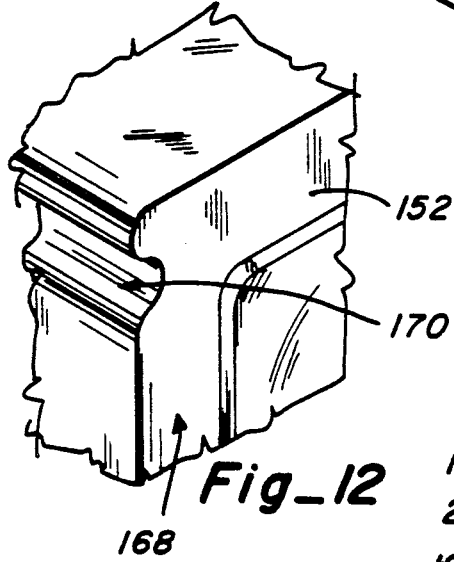
Fig_12
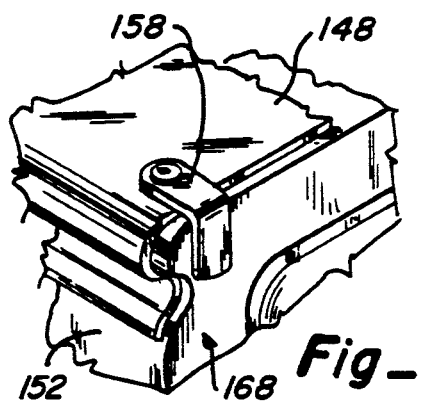
Fig_13
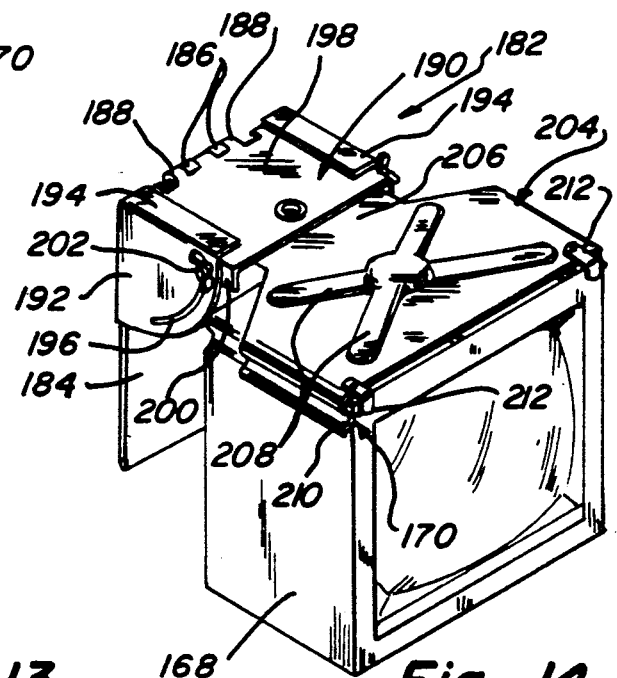
Fig_14

WALL/CEILING SUPPORT FOR TELEVISION MONITOR

BACKGROUND OF THE INVENTION

1. Field of the Invention

The present invention relates generally to supporting structures for television monitors and more particularly to a support system for mounting a television monitor on either a wall or a ceiling.

2. Description of the Prior Art

Even though television monitors in recent years have been reduced in size through the miniaturization of electronic components, the monitors still require substantial shelf or table-top space when positioned for convenient viewing. Larger television monitors, of course, are of the console-type, and merely sit on the floor, but again take up valuable space in a room. In some environments, such as hospital rooms, taverns, or the like, floor, shelf and table-top space is many times not available, and to remedy the problem, television monitors have been suspended by appropriate structure from a wall or ceiling of the room. An example of a suspension system for a television of the type that might be mounted on a ceiling joist is shown in U.S. Pat. No. 3,574,340 issued to Kenneth A. Busche on Apr. 13, 1971. The device illustrated in the Busche patent includes a swivel mounting plate from which a pair of oppositely directed support arms extend laterally on a television monitor and support arcuate hanger elements that are adapted to be secured by attachment to the side walls of the television monitor. A system of the type disclosed in the Busche patent solves the space problem in that the television monitor is suspended from the ceiling in an out-of-the-way location, but is done so in a manner that is not aesthetically appealing and also defaces the housing for the television monitor so that it would not be aesthetically appealing if later converted from the suspended mounting to use on a table top or the like.

The concept of mounting television equipment on a ceiling in a relatively attractive housing is not new in that U.S. Pat. No. Des. 273,012 issued to Edward Kozloski on Mar. 13, 1984, discloses a housing for a surveillance camera which would appear to be mountable on a ceiling in a reasonably attractive manner.

The prior art would appear to be devoid, however, of a system uniquely adapted to support a television monitor from either the ceiling or wall of a building structure and in a manner such that the angle the television monitor makes with horizontal is adjustable to accommodate various viewing angles.

It is to overcome the shortcomings in prior art systems and to provide a convenient convertible system wherein the television monitor can be suspended from either a ceiling or a wall that the present invention has been developed.

SUMMARY OF THE INVENTION

The wall/ceiling support system of the present invention includes a mounting element which is directly connectable to either a horizontal structural member such as a ceiling or a vertical structural member such as a wall and a support element which is operably connectable to a television monitor. Adjustment means are further provided to operably interconnect the support element with the mounting element so that the support element is angularly adjustable into various orientations to facilitate viewing of the television monitor. The invention is disclosed in several embodiments with the mounting element being connectable to a horizontal surface such as a ceiling in some embodiments, to a vertical surface such as a wall in other embodiments, or to either a horizontal or vertical surface in still other embodiments. When the mounting element is connected to a horizontal surface, the mounting element includes a swivel so that the television monitor can be pivotally moved about a vertical axis for optimal viewing.

In the preferred embodiments, the television monitor is connected to the support element by suspension means which can either be flexible, non-extensible straps adapted to extend around the television monitor or complementing connectors between the housing of the television monitor and the support element.

In one embodiment, wherein the system is mounted on a vertical support surface, the support element is pivotally mounted for adjustable movement about a vertical axis, again to optimize viewing of the monitor. Means are also provided in some wall mount embodiments for supporting an auxiliary item such as a VCR.

An added feature of the invention resides in the fact that the system is designed so that it can be sold as an entire unit, but mounted at the user's option on a horizontal or vertical support surface. Or, the system can be marketed for mounting specifically on a vertical surface or specifically on a horizontal surface. Accordingly, the system can be sold with selected components improving the marketability characteristics of the system.

Other aspects, features and details of the present invention can be more completely understood by reference to the following detailed description of a preferred embodiment taken in conjunction with the drawings, and from the appended claims.

DESCRIPTION OF THE DRAWINGS

FIG. 1 is an isometric view of a first embodiment of the present invention adapted for mounting on a horizontal support surface with a television monitor suspended therefrom.

FIG. 2 is a fragmentary isometric view of the system illustrated in FIG. 1 with an auxiliary plate connected thereto and wherein the auxiliary plate is adapted to be mounted on a vertical support surface.

FIG. 3 is an enlarged fragmentary side elevation illustrating the connection of the mounting plate of FIG. 1 to a horizontal support surface.

FIG. 3A is a further enlarged fragmentary view illustrating one embodiment of details of the arcuate slot utilized in adjusting the angle of the support plate relative to horizontal.

FIG. 4 is an enlarged front elevation of the system as shown in FIG. 1 with portions being removed for size considerations.

FIG. 5 is a section taken along line 5—5 of FIG. 3.

FIG. 6 is a section taken along line 6—6 of FIG. 4.

FIG. 7 is a partially exploded isometric view of a second embodiment of the present invention of the type adapted to be mounted on a vertical support surface and with a television monitor illustrated in dashed lines being supported thereon.

FIG. 8 is an enlarged isometric view of the embodiment shown in FIG. 7 with a VCR being supported on the system.

FIG. 9 is an enlarged section taken along line 9—9 of FIG. 7.

FIG. 10 is an enlarged section taken along line 10—10 of FIG. 7.

FIG. 11 is an isometric view of a third embodiment of the present invention showing a wall attachment plate being separated from the system.

FIG. 12 is an enlarged fragmentary view illustrating a portion of the housing of a television monitor for use in connection with the system illustrated in FIG. 11.

FIG. 13 is a fragmentary isometric view similar to FIG. 12 showing the television monitor supported on the support member of the system illustrated in FIG. 11.

FIG. 14 is an isometric view showing a fourth embodiment of the present invention having a television monitor suspended therefrom and being adapted to be mounted on a vertical support surface.

DESCRIPTION OF THE PREFERRED EMBODIMENTS

Referring first to FIG. 1, a first embodiment of the present invention is illustrated as a ceiling or horizontal mount system 20 and is shown supporting a conventional television monitor 22. The system includes a mounting plate 24 having a swivel 26 mounted on a top surface thereof and a pair of identical depending laterally opposed ears 28 forming a part of an adjustment system from which a support member 30 is pivotally mounted.

The mounting plate 24 is generally rectangular in configuration with the swivel 26 being anchored to the top surface of the mounting plate in a conventional manner. The swivel is of a type described in my copending application Ser. No. 07/554,701 filed Jul. 18, 1990 and entitled "SUPPORT STRUCTURE FOR TELEVISION MONITOR," and the disclosure therein is hereby incorporated by reference. The swivel includes two component circular plates with a lower circular plate 34 being secured to the top surface of the mounting plate of the support system and an upper circular plate 32 being attachable to a ceiling 34, preferably along a joist, with the two circular plates being operably interconnected for a relative rotative movement on confined bearing members 35, FIG. 5. It will therefore be appreciated that, when the upper circular plate is secured to a ceiling, the mounting plate of the support system is pivotable through substantially a 360° angle.

The depending ears 28 as best seen in FIGS. 1 and 3 are substantially semi-circular in configuration and have an arcuate slot 36 formed adjacent to a leading edge of each ear. Near the trailing edge of each ear, a hole 38 is provided to receive a pivot shaft 40, FIGS. 1-4 and 6, which supports a trailing edge 42 of the support member 30 in a manner to be described hereinafter.

The support member 30, FIGS. 1-6, is substantially identical in size and outside configuration to the mounting plate 24 and has a large rectangular opening 44 in the center thereof. Lateral flanges 46 depend from opposite parallel sides of the support member and parallel side walls 48 depend in parallel relationship to the flanges 46 from lateral sides of the rectangular opening 44. Each side wall has a pair of adjacent slots 50 formed therein which are in alignment with corresponding slots 50 in the opposite side wall to receive and guide suspension straps 52 which may take the form of conventional nylon webbing or the like. The straps are flexible but non-extensible and include length-regulating means in the form of a conventional rachet-type connector 54 disposed in the rectangular opening 44 so that the length of the straps can be selectively adjusted to receive and tightly retain as well as support the television monitor 22 from the support member 30. Each flange 46 has an opening 56, FIGS. 5 and 6, formed therein at a location approximately one-third the length of the support member from its trailing edge. A support pin 58 extends through the opening 56 in the flange and through the arcuate slot 36 in the adjacent associated ear of the mounting plate so that a wing nut 60 can be threadedly received on the exposed end thereof.

As mentioned previously, the pivot shafts 40, FIGS. 1, 3 and 6, are disposed in the holes 38 provided through the flanges 46 adjacent the trailing edge of the support member 30 with the pivot shafts extending through the associated ear 28 and being secured thereto by any conventional fastener member. As will be appreciated, the support member is thereby pivotally connected to the mounting plate and can be selectively and positively positioned in any desired angular orientation relative to horizontal by tightening the wing nuts 60 against the outer surface of the associated depending ears. In this manner, the support member can be optimally positioned for viewing of the television monitor suspended from the support member.

The arcuate slots 36 formed in the depending ears 28 may have angular teeth 66 formed therein as illustrated in FIG. 3A, so that the support pin 58 can be seated in a notch 68 formed between adjacent teeth as a more positive means of retaining the support member, and thus the television monitor, in a selected angular orientation relative to the mounting plate. In order to accommodate the slight amount of movement of the support pin necessary to move the pin in and out of adjacent notches 68, the opening 56 through the flange of the support member is slightly larger than the support pin itself.

A variation of the embodiment of the support system shown in FIG. 1 is illustrated in FIG. 2, wherein a wall plate 70 is shown secured to the trailing edge 72 of the mounting plate 24 as with suitable fasteners (not shown). The wall plate is a flat plate of very rigid steel or the like having a perpendicular horizontal extension 74 along the upper edge thereof which is adapted to underlie and be connected to the trailing edge of the mounting plate. Appropriate aligned openings 76 are provided through the mounting plate and the horizontal extension 74 on the wall plate to accommodate the desired rigid and positive interconnection required between the wall plate and the mounting plate. It will be appreciated that the embodiment shown in FIG. 2 can be utilized to mount the support system 20 on a vertical support surface such as the wall (not shown) of a building structure while still providing an angular adjustment capability of the television monitor relative to horizontal through the adjustment arrangement described previously in connection with FIG. 1.

A third embodiment 78 of the support system of the present invention is illustrated in FIGS. 7 through 10, with this embodiment being adapted for mounting solely on a vertical surface. In this embodiment, the mounting plate is a wall plate 80 having a hinge 82 formed along its upper edge to which a support member 84 is pivotally connected. A pair of forwardly projecting ears 86 form integral projections from an upper portion of each side edge of the wall plate 80 with the ears forming a quarter of a circle and having an arcuate slot 88 formed adjacent to the curved edge thereof. Each ear 86 has a horizontal projection 90 along its upper edge extending toward a similar projection on the opposite ear with each projection 90 having a pair of openings 92 provided therethrough for a purpose to be described later.

The hinge 82 formed along the upper edge of the wall plate 80 includes a pair of spaced forwardly curled fingers 94 defining a horizontal passage therethrough. The passage is adapted to receive a pivot pin (not seen). The fingers 94 are adapted to interdigitate with similar downwardly curled spaced fingers 96 on the trailing edge of the support member 84 whereby when the fingers 94 and 96 on the mounting plate and the support member respectively are interdigitated and aligned, the pivot pin can be extended horizontally therethrough to establish the desired pivotal relationship between the support member and the mounting plate.

The support member 84 is formed in two component parts with a rear portion 98, FIG. 9, being of rectangular configuration and having the curled fingers 96 formed along the trailing edge thereof. The rear portion 98 is interconnected with a forward portion 100 by a conventional swivel 102 adjacent the forward edge of the rear portion and the trailing edge of the front portion. It will therefore be seen that the entire support member 84 is pivotal about a horizontal axis, and the forward portion 100 is in turn pivotal about an axis that is perpendicular to but not intersecting with the horizontal axis.

The forward portion 100 is also of generally rectangular configuration having its leading and trailing edges formed in an arc and with a large rectangular opening 104 formed in the center thereof. A pair of depending side walls 106, FIG. 8, extend downwardly from the side edges of the opening and have spaced horizontal slots 108 formed therein to receive suspension straps 110. As in the first described embodiment, the suspension straps are preferably nylon webbing or the like and have their opposite ends interconnected by a conventional rachet-type mechanism 112 for adjusting the effective length of the straps whereby a television monitor 114 can be tightly gripped with the straps and supported from the support member 84 in the desired manner.

The rear portion 98 of the support member 84 has depending side walls 116, FIG. 8, along opposite lateral edges with each side wall having an opening (not seen) therethrough adapted to receive a support pin (not seen). The support pins extend through the associated side wall 116 and also through the arcuate slot 88 in the adjacent forwardly projecting ear on the mounting plate and receive a wing nut 120 on an exposed threaded end thereof. As with the first described embodiment, the support pin 118 may be of slightly smaller dimension than the opening through the side wall 116 and the arcuate slot may have a series of spaced teeth defining notches into which the support pin can be positioned to desirably orientate the angle of the support member relative to horizontal so as to place the television monitor in a desired viewing angular orientation.

An auxiliary support plate 122 is adapted to be seated and attached to the horizontal projections 90 on the ears 86 for receiving and supporting an auxiliary television item such as a VCR 124. The auxiliary support plate 122 is generally rectangular in configuration having upturned stops 126 along the front and both side edges which assist in positively positioning and retaining a VCR or the like on top of the auxiliary support plate. The rear edge of the auxiliary support plate 122 has a pair of down-turned curled fingers 128 as best seen in FIG. 10, adapted to pass around and cooperate with the trailing edge of the support member 84 to retain the auxiliary support plate in position. The auxiliary support plate is provided with pairs of openings 130, FIG. 7, along the lateral edges thereof which are adapted to be aligned with the openings 92 through the horizontal projections 90 on the ears so that suitable fasteners can be passed therethrough to further secure the auxiliary support plate to the wall plate.

A fourth embodiment 132 of the support system of the present invention is shown in FIGS. 11 through 13. In this embodiment, a generally rectangular mounting plate 134 is adapted for securement to a ceiling joist or the like through a swivel 136 of the type described in connection with the embodiment of FIG. 1. The mounting plate is of generally rectangular configuration and has a pair of depending ears 138 forming a quarter circle near the trailing end thereof. Each ear has an arcuate slot 140 formed adjacent to its curved edge and has an opening adjacent the upper trailing end of the ear to receive a pivot shaft 142.

A support member 144 is of generally planar configuration and has a rear, relatively narrow and rectangular portion 146 extending between the depending ears 138 and a relatively large and outwardly flared integral forward portion 148 projecting forwardly beyond the mounting plate 134. The relatively large forward portion 148 includes raised crisscrossing reinforcement ribs 150 to strengthen the forward portion so that it is capable of supporting a relatively heavy television monitor 152. The forward portion 148 has a pair of parallel lateral edges 154 which have been deformed into a substantially S-shaped cross-sectional configuration defining an inwardly projecting rib 156 extending in spaced relationship from an under surface of the forward portion 148 with each rib projecting toward a corresponding rib on the opposite side of the support member. A generally L-shaped lock arm 158 is pivotally connected to the support member 144 adjacent to the front and lateral edges thereof for a purpose to be described hereinafter.

The sides of the rear portion 146 of the support member 144 have down-turned flanges 160 with an opening provided therethrough which is adapted to receive a support pin (not seen). The support pins also project through the arcuate slot 140 in the depending ears 138 and threadedly receive a wing nut 162 as with the previously described embodiments. Each flange 160 also has an opening provided therethrough adjacent to its trailing edge for receipt of the pivot shaft 142 which also projects through the openings in the ears. The shaft 142 is positively positioned in any conventional manner.

The embodiment 132 of the support system illustrated in FIG. 11 is adapted to cooperate with a uniquely designed television monitor 152 as best seen in FIG. 12 that has a housing 168 with a generally S-shaped deformation 170 along upper lateral edges thereof. The deformations 170 mate with the S-shaped lateral edges 154 of the front portion of the support member 144. The deformations could be formed along lateral edges of an auxiliary plate (not shown) which could be bolted or otherwise secured to the top of a conventional T.V. monitor as an alternative embodiment.

As is best seen in FIG. 13, the housing 168 of the television monitor can be slid axially into the S-shaped deformation in the support plate so that the monitor is positively supported and suspended from the support member. The pivotal lock arms 158 are adapted to be swung from a laterally deployed position as illustrated in FIG. 11 to a forwardly deployed position wherein they overlie the front face of the television monitor to retain the monitor in a connected relationship with the support member.

As with the previously described embodiments, the arcuate slots 140 in the depending ears 138 are preferably notched and the support pins are preferably slightly smaller in diameter than the openings through the flanges of the support member 144 so that the angular relationship of the support member with the mounting plate 134 can be selected and positively positioned by tightening the wing nut 162 against the depending ear.

As a modification to this embodiment, a wall plate 172 is provided of a very strong and rigid material. The wall plate has a forward perpendicular projection 174 from its top edge with the projection having a plurality of openings 176 therethrough. The openings are adapted to be aligned with similar openings 178 through the trailing edge of the mounting plate 134 so that the wall plate can be securely and positively connected to the mounting plate with suitable fasteners. In this manner, the wall plate can be secured to a vertical support surface by anchors (not shown) extending through holes 180 along a longitudinal axis of the wall plate.

A fifth embodiment 182 of the present invention is illustrated in FIGS. 12 through 14 with this embodiment being adapted for attachment to a vertical support surface such as a wall. In this embodiment, the mounting plate 184 is a vertical plate adapted to be placed in abutting relationship with the vertical support surface and includes a plurality of forwardly curled and spaced fingers 186 along its upper edge forming a part of a hinged connection with similarly formed curling fingers 188 along the trailing edge of a support member 190. The fingers 188 on the support member are adapted to interdigitate with the fingers 186 on the mounting plate and are interconnected with a pivot pin (not seen) so that the support member 190 can pivot relative to the upper edge of the mounting plate 184.

The mounting plate 184 has a pair of forwardly projecting ears 192 of quarter circle configuration formed along lateral edges at the upper ends thereof with each ear 192 having a horizontal projection 194 extending toward a corresponding projection on the ear on the opposite side of the mounting plate. The ears also have arcuate slots 196 formed therein adjacent to the curved edges of the ears.

The support member 190 has two interconnected component parts with a rear portion 198 being of substantially rectangular configuration and having depending side walls 200 along lateral edges thereof. Each side wall 200 has an opening therethrough (not seen) adapted to receive a support pin (not seen) which projects through the opening and through the arcuate slot 196 in the associated ear 192 to receive a threaded wing nut 202. The trailing edge of the rear portion 198 has the curled fingers 188 formed therein for operative and pivotal interconnection with the mounting plate 184 by a pivot pin (not seen).

A forward portion 204 of the support member 190 has a relatively narrow rear segment 206 which is pivotally connected to the rear portion 198 with a conventional swivel 206 as with the embodiment shown in FIG. 7. The forward portion 204 flares forwardly and outwardly from the rear segment 206 defining an enlarged plate-like area which is reinforced with crisscrossing raised ribbing 208. The forward portion has deformed S-shaped lateral edges 210 as in the embodiment illustrated in FIG. 11. The lateral edges 210, as with the embodiment illustrated in FIG. 11 are adapted to complement and mate with deformed upper side edges 170 of a television monitor housing 168 as illustrated in FIGS. 12 and 13. L-shaped lock arms 212 are pivotally connected at opposite sides of the leading edge of the support member 190 to selectively secure the television monitor to the support member.

It will be appreciated from the afore-described embodiments of the support system of the present invention that various arrangements may be utilized depending upon particular applications. The systems include embodiments whereby a television monitor can be suspended from a ceiling and/or from a wall and also arrangements wherein the system can be marketed specifically for connection to a ceiling or for connection to a wall. In this manner, a wide range of marketing flexibility is provided in a system that supports a television monitor dependably and so that it can be adjusted angularly about a horizontal axis for optimal viewing and in some embodiments also about a vertical axis.

Although the present invention has been described with a certain degree of particularity, it is understood that the present disclosure has been made by way of example, and changes in details or structure may be made without departing from the spirit of the invention, as defined in the appended claims.

I claim:

1. A support for operatively connecting a television monitor to a structural surface comprising in combination, a support member including connecting means for operably connecting the support member to a television monitor so that the television monitor is suspended from the support member, said connecting means including a flexible strap adapted to be extended around the television monitor, mounting means, including adjustment means, operably connected to the support member whereby the relative angular relationship between said support member and horizontal can be selectively adjusted, said mounting means being operatively securable to a structural surface, and said adjustment means including a pair of side plates connected to said mounting means, and lock members, said side plates and lock members being operatively associated with said support means for selectively securing the support member in a selected angular relationship with horizontal.

2. The support of claim 1 wherein said connecting means further includes length regulating means for regulating the length of said flexible strap.

3. The support of claim 2 wherein said support member is generally planar in configuration and includes an opening therein in which said length regulating means is disposed for easy manipulation.

4. The support of claim 1 wherein said support member is generally planar in configuration and includes a pair of down turned flanges having slot means therethrough, said slot means receiving said flexible strap to retain a predetermined relationship between said support member and the strap.

5. The support of claim 4 wherein said support member is pivotally connected to said side plates and wherein the side plates have arcuate slots formed therein and said lock members are selectively positionable in said slots to cooperate therewith in retaining the support member in a selected angular relationship with horizontal.

6. A support for operatively connecting a television monitor to a vertical wall comprising in combination,
   a support member including connecting means for operatively connecting the support member to a television monitor,
   mounting means, including adjustment means, operably connected to the support member whereby the relative angular relationship between said support member and horizontal can be selectively adjusted, said mounting means being operatively securable to said vertical wall, and
   said adjustment means including a pair of side plates connected to said mounting means, and lock members, said side plates and lock members being operatively associated with said support means for selectively securing the support member in a selected angular relationship with horizontal.

7. The support of claim 6 further including pivot means for pivotally connecting the support member to the mounting means.

8. The support of claim 7 wherein said support member includes two component parts with one of said parts being connected to said mounting means for pivotal movement about a first axis and the other of said parts being connected to said one part for pivotal movement about a second axis that is perpendicular to but nonintersecting with said first axis.

9. The support of claim 8 wherein said two component parts of said support member are of generally planar configuration and wherein said connecting means form a part of said other of said parts.

10. The support of claim 9 wherein said connecting means include a flexible strap which is adapted to be extended around said television monitor.

11. The support of claim 10 wherein said connecting means further include length-regulating means for regulating the length of said flexible strap.

12. The support of claim 11 wherein said other of said parts of the support member includes an opening therein in which said length regulating means is disposed for easy manipulation.

13. The support of claim 10 wherein said other of said parts of the support member includes a pair of down turned flanges having slot means therethrough, said slot means receiving said flexible strap to retain a predetermined relationship between said support member and the strap.

14. The support of claim 9 further including a substantially horizontal plate member seated on and secured to said side plates, said plate member adapted to support an auxiliary item to said television monitor.

15. The support of claim 7 wherein said support member is pivotally connected to said mounting means and wherein said side plates have arcuate slots formed therein and said lock members are selectively positionable in said slots to cooperate therewith in retaining the support member in a selected angular relationship.

16. A support for operatively connecting a television monitor to a structural surface comprising in combination,
   a support member including connecting means for operably connecting the support member to a television monitor, said connecting means including slidably related connectors on each of said television monitor and support member whereby said television monitor can be slidably removed from said support member,
   mounting means, including adjustment means, operably connected to the support member whereby the relative angular relationship between said support member and horizontal can be selectively adjusted, said mounting means being operatively securable to a structural surface, and
   said adjustment means including a pair of side plates connected to said mounting means, and lock members, said side plates and lock members being operatively associated with said support means for selectively securing the support member in a selected angular relationship with horizontal.

17. The support of claim 16 wherein said connecting means includes a tongue-in-groove-type connector on said television monitor and a complementing tongue-in-groove-type connector on said support member.

18. The support of claim 17 further including a lock finger for retaining a connected relationship of said tongue-in-groove connectors.

* * * * *